Dec. 5, 1933.　　　　　K. H. CONLEY　　　　　1,938,319
MEANS FOR CONTROLLING GEAR SHIFTING MECHANISM
Filed March 10, 1932　　　11 Sheets-Sheet 3

INVENTOR.
Kurt H. Conley
BY
Christian M. Newman
ATTORNEY

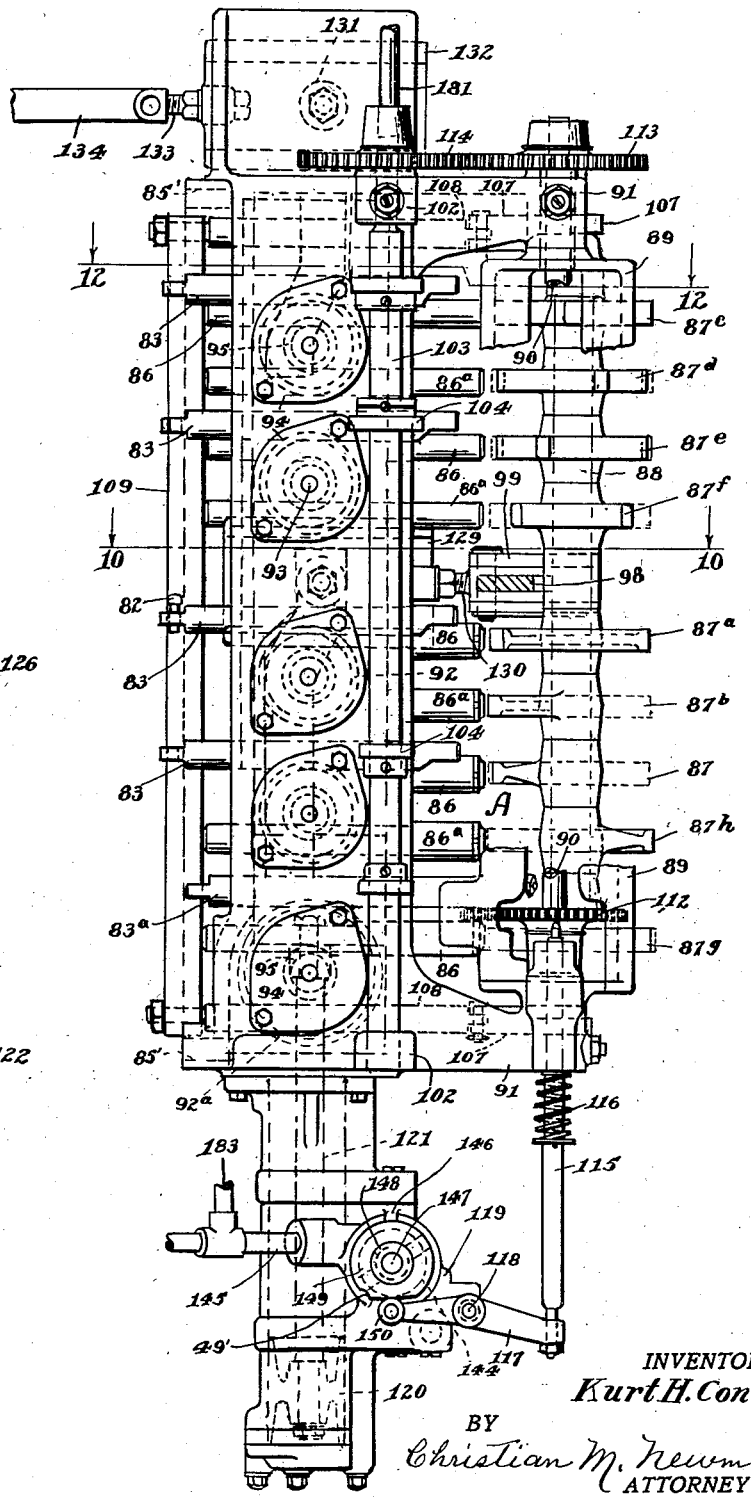

Dec. 5, 1933.  K. H. CONLEY  1,938,319
MEANS FOR CONTROLLING GEAR SHIFTING MECHANISM
Filed March 10, 1932  11 Sheets-Sheet 5

INVENTOR.
Kurt H. Conley
BY
ATTORNEY
Christian M. Newman

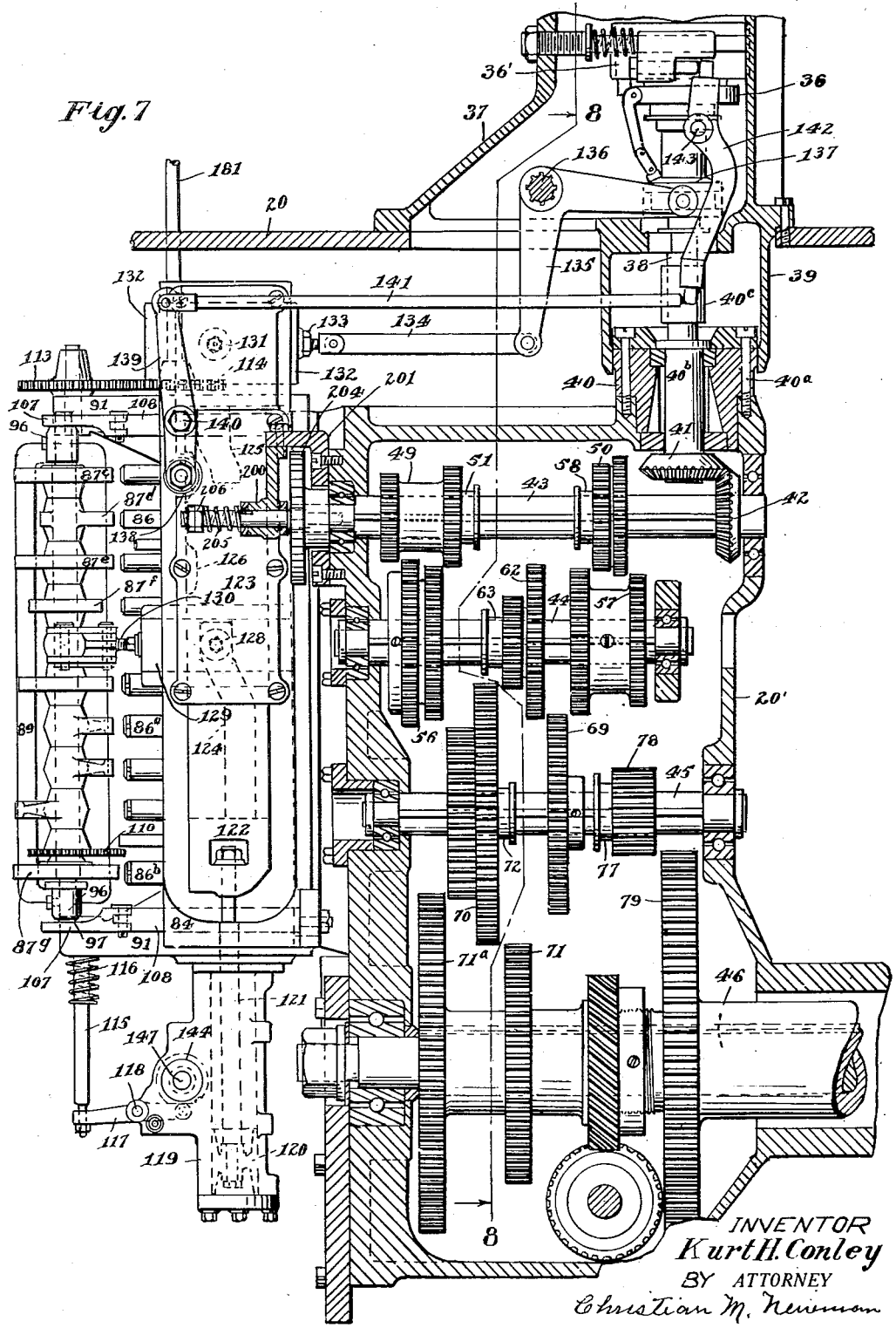

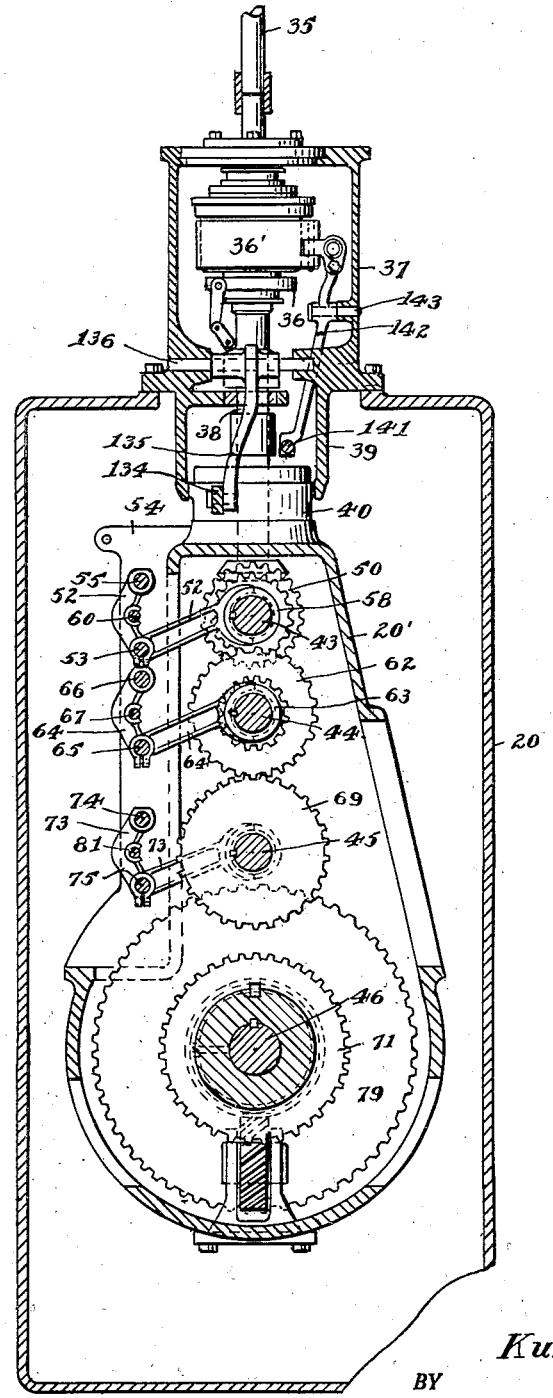

Dec. 5, 1933.  K. H. CONLEY  1,938,319
MEANS FOR CONTROLLING GEAR SHIFTING MECHANISM
Filed March 10, 1932  11 Sheets-Sheet 8
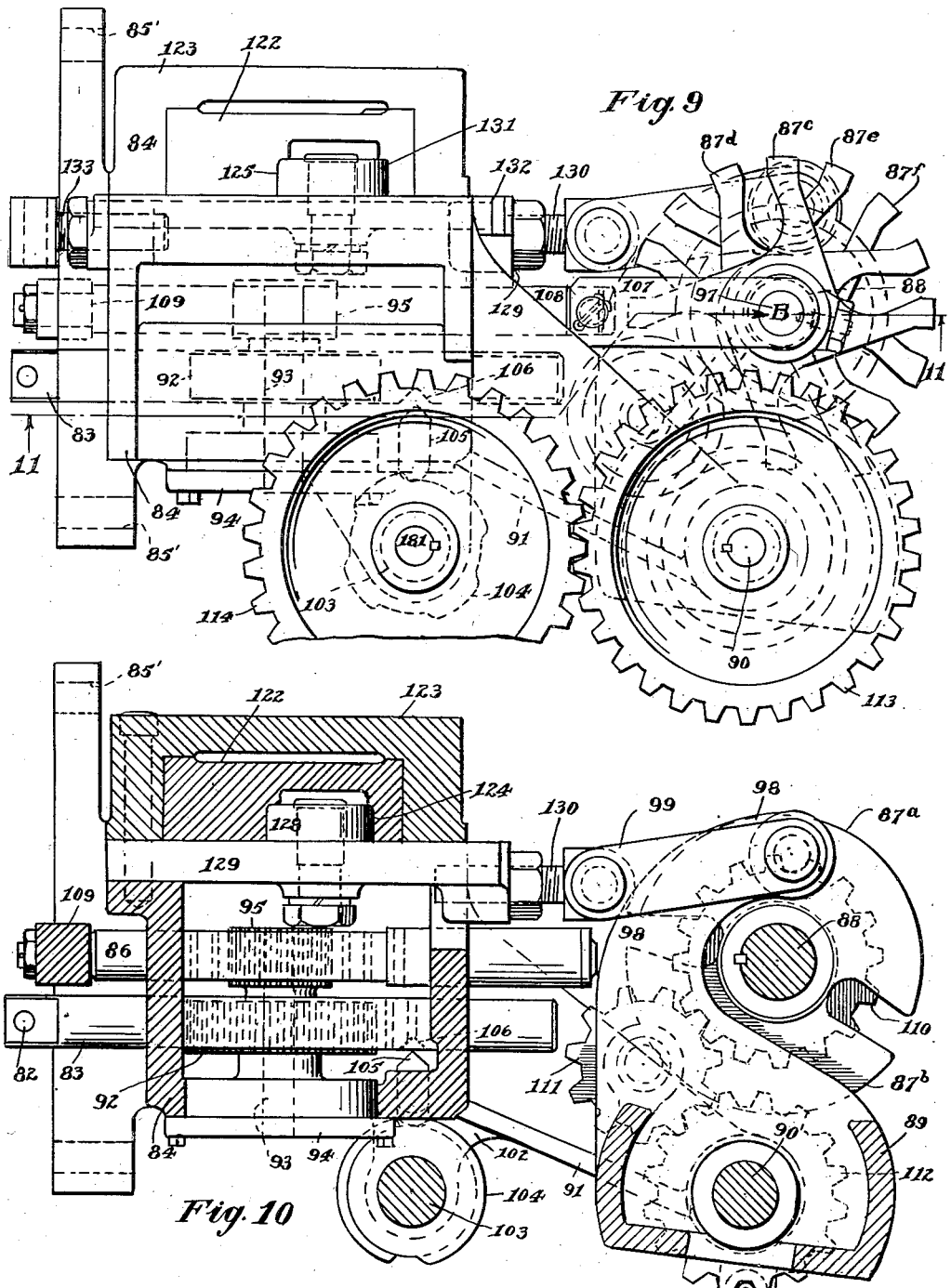
INVENTOR
Kurt H. Conley
BY Christian M. Newman
ATTORNEY Dec. 5, 1933.   K. H. CONLEY   1,938,319
MEANS FOR CONTROLLING GEAR SHIFTING MECHANISM
Filed March 10, 1932   11 Sheets-Sheet 9
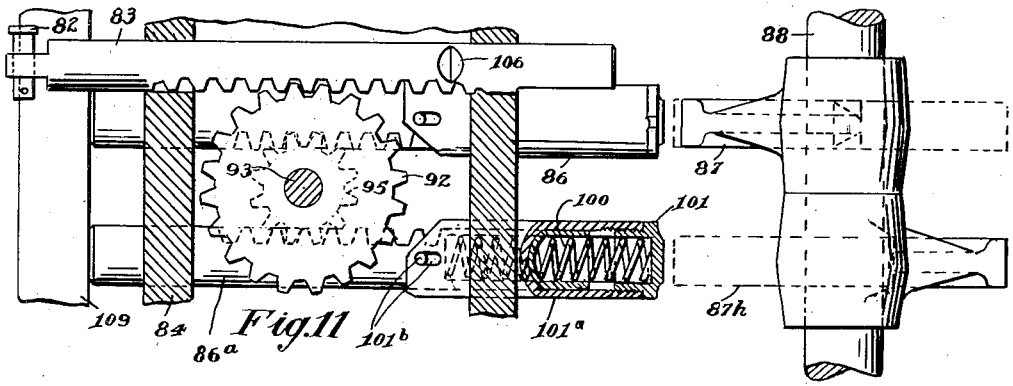
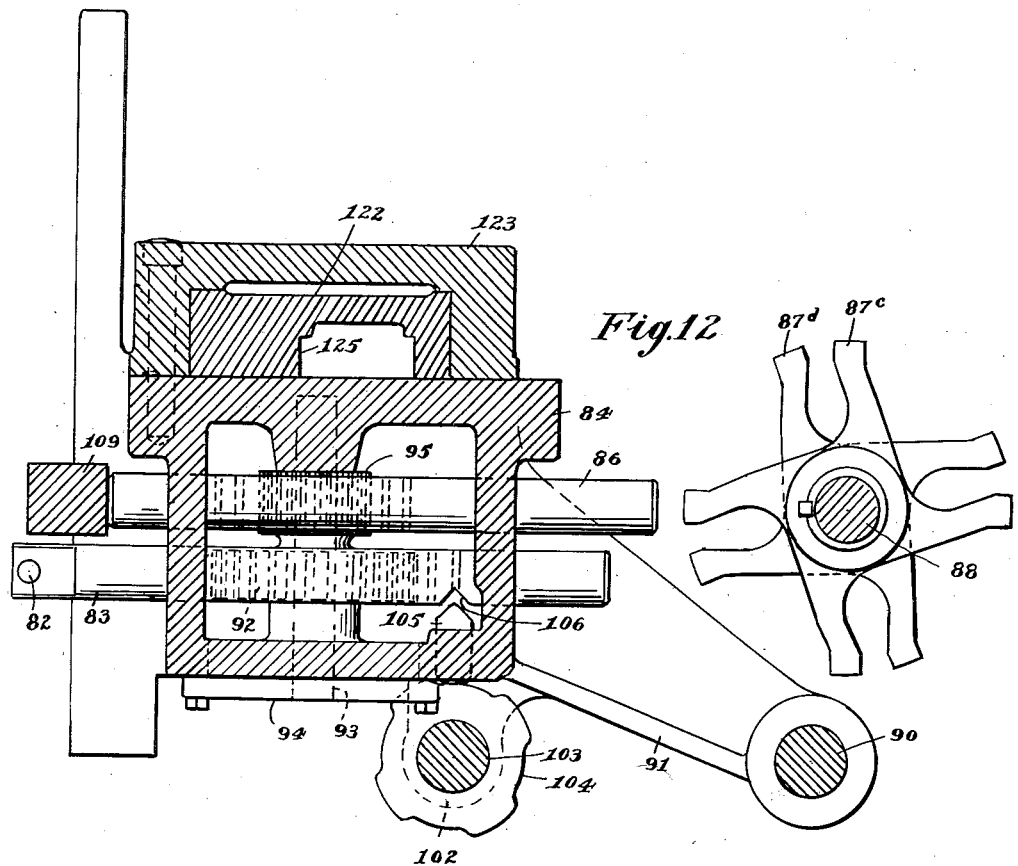
INVENTOR.
Kurt H. Conley
BY
Christian M. Newman
ATTORNEY

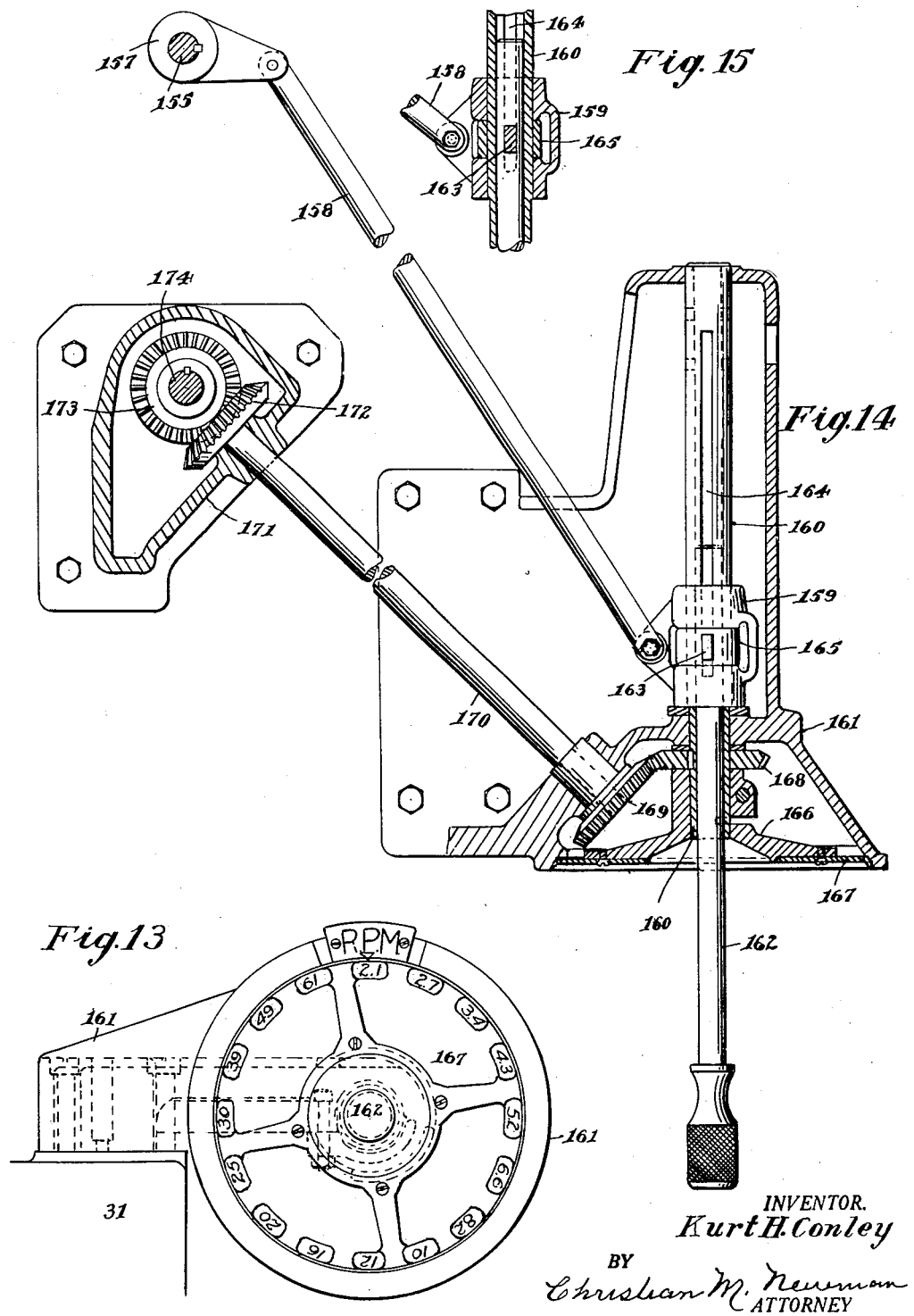
Dec. 5, 1933.   K. H. CONLEY   1,938,319
MEANS FOR CONTROLLING GEAR SHIFTING MECHANISM
Filed March 10, 1932   11 Sheets-Sheet 10
INVENTOR.
Kurt H. Conley
BY
Christian M. Newman
ATTORNEY Dec. 5, 1933.　　　　K. H. CONLEY　　　　1,938,319
MEANS FOR CONTROLLING GEAR SHIFTING MECHANISM
Filed March 10, 1932　　　11 Sheets-Sheet 11
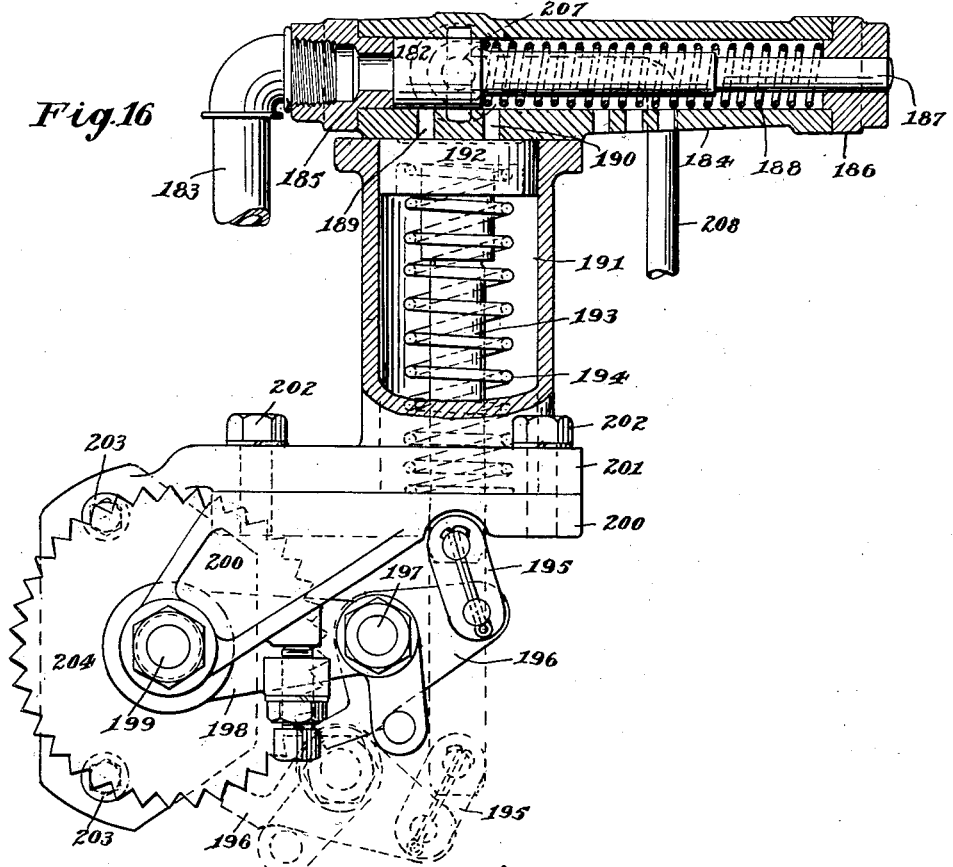
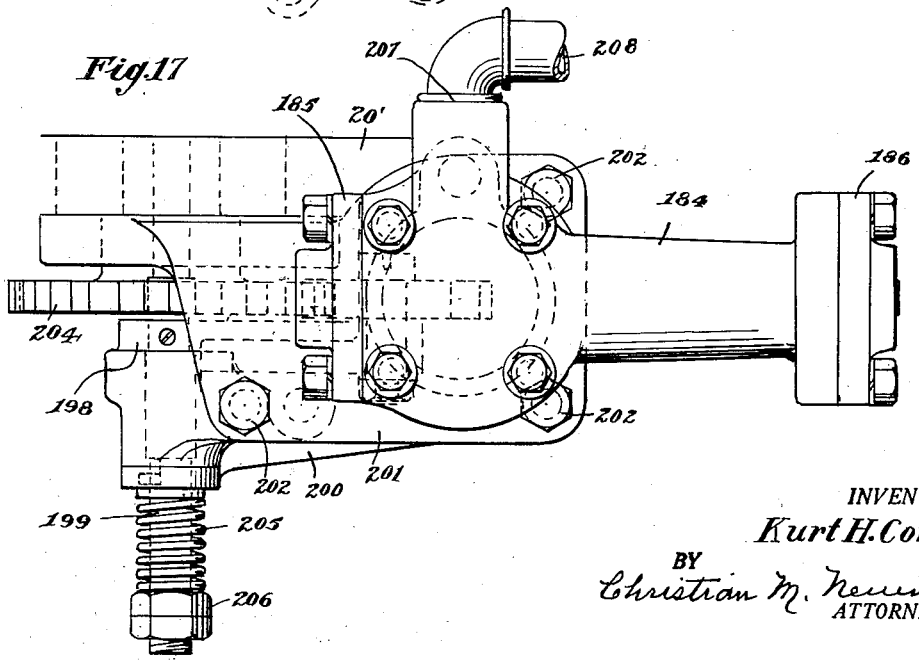
INVENTOR.
Kurt H. Conley
BY
Christian M. Newman
ATTORNEY Patented Dec. 5, 1933

1,938,319

UNITED STATES PATENT OFFICE 1,938,319

MEANS FOR CONTROLLING GEAR SHIFTING MECHANISM

Kurt H. Conley. Bridgeport, Conn., assignor to The Bullard Company, a corporation of Connecticut Application March 10, 1932. Serial No. 597,905

44 Claims. (Cl. 74—58)

This invention relates to new and useful improvements in a selective controlling device for gear shifting mechanism such as is adapted to be used in connection with machine tools. The invention is especially adapted for use in connection with both single and multiple spindle machines, for boring, drilling, turning, milling and the like, and wherein it is desired to obtain a large number of different speeds.

An object of the invention is to provide novel means whereby numerous selection of speeds and changes of gears may be conveniently and quickly obtained by hydraulic or mechanical means, and through the manipulation of a single handle conveniently located on the machine.

A further object of the invention is to provide automatic means whereby the necessary gears of the train, in case they become jammed, may be turned slightly in a way to bring them into registration and to cause them to mesh or be operatively engaged.

Another object of the invention is to provide suitable mechanical connections with the operating handle, which serve, when the handle is properly located, to set its dial and properly locate it for the desired speed, and whereby another operation of the same handle will open the hydraulic valve which in turn throws in a clutch to engage and start the machine.

The invention further includes interlocking mechanism that serves to lock all the gears of the change speed mechanism or head stock, except those which have been selected to produce a particular speed, so as to prevent any two or more of the gears becoming engaged and damaged. The invention also includes locking means to insure the proper positioning of the sectors when dialing, to facilitate such positioning and locking in case the dialing is inaccurately performed by the operator.

The invention is likewise designed so as to insure the return of all gears of the head stock back to neutral position every time any particular gear drive is disengaged, meaning by the use of the word "neutral" that no gears are engaged.

My improved gear shifting means, as well as the change speed mechanism with which it is herein shown connected, is herein shown applied to a vertical turret lathe type of machine designed to perform boring, turning, and other operations upon large and small diameter work. The change speed mechanism is semi-automatic and may consequently be operated by a minimum expenditure of time and effort.

A further object of the invention is to provide means for operating the brake and clutch in a head stock drive simultaneously with the operation of shifting the gears of the head stock.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several Figs. of the accompanying drawings, forming a part of this specification, and upon which Fig. 1 shows a side elevation of an improved form of machine tool of the "vertical turret lathe" type, and to which the invention has been shown applied, and which drawing more particularly serves to illustrate the exterior manual control means for the novel change speed mechanism.

Fig. 4 is an enlarged side elevation of the change speed mechanism enclosed in the rear portion of the base of the machine, as shown in Fig. 2;

Fig. 5 is a detached perspective view of a cam slide designed to be operated by the hydraulic cylinder, shown in the lower end portion of Fig. 4, for controlling the mechanism that shifts the gears;

Fig. 7 is a sectional side elevation of the gear shifting mechanism as seen from the opposite side of Figs. 2 and 4, and including the change speed gears operated thereby and shown in neutral positions;

Fig. 8 shows a vertical sectional view taken through the gear case on line 8—8 of Figs. 2 and 7, showing the gearing to be shifted, and the slidable forks by which said gears are operated;

Fig. 9 is a top plan view of the hydraulically operated change speed mechanism shown in Figs. 2 and 4, though on an enlarged scale from that of each of said Figs.;

Fig. 10 is a horizontal cross sectional view taken on line 10—10 of Fig. 4 and drawn upon the same scale as that of Fig. 9;

Fig. 11 is a fragmentary vertical sectional view taken on line 11—11 of Fig. 9, at a point indicated by "A" in Fig. 4, and illustrating one of the several units employed for positioning the several sliding gears;

Figure 1:
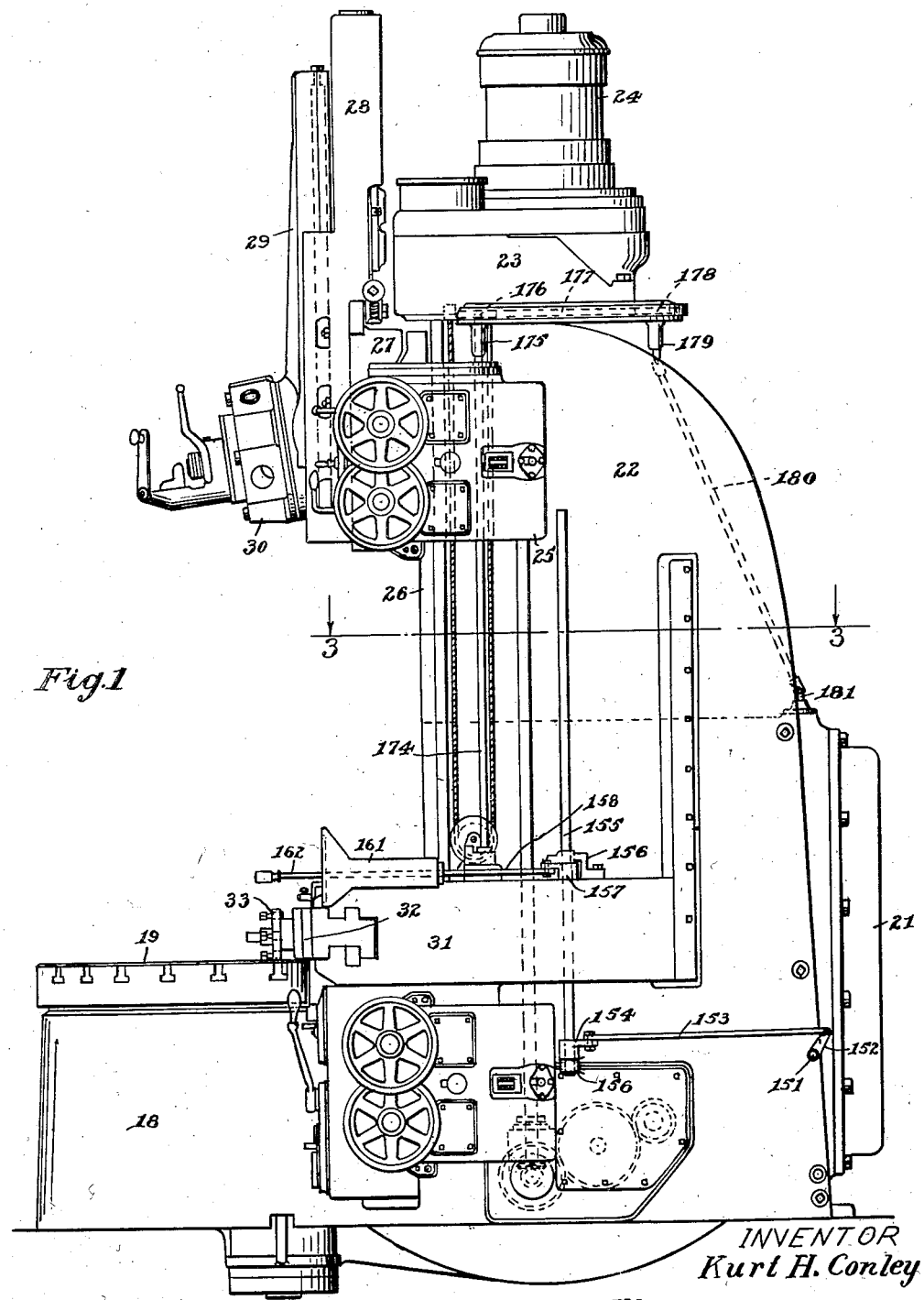
Figure 3:
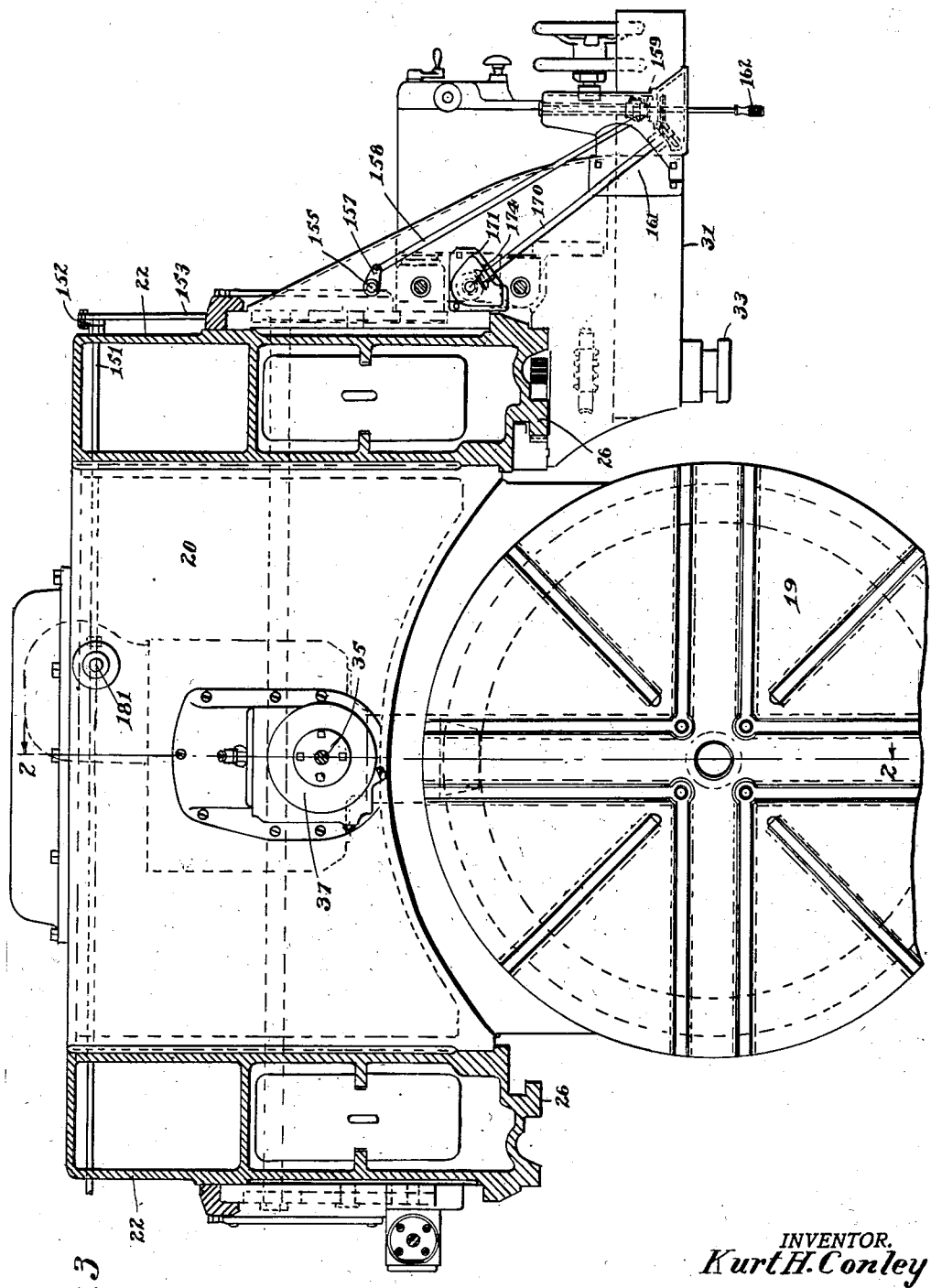
Fig. 3 is a sectional plan view, on a slightly enlarged scale, taken on line 3—3 of Fig. 1, better to illustrate the relative position of the manual control mechanism shown in Fig. 1.
Figure 6:
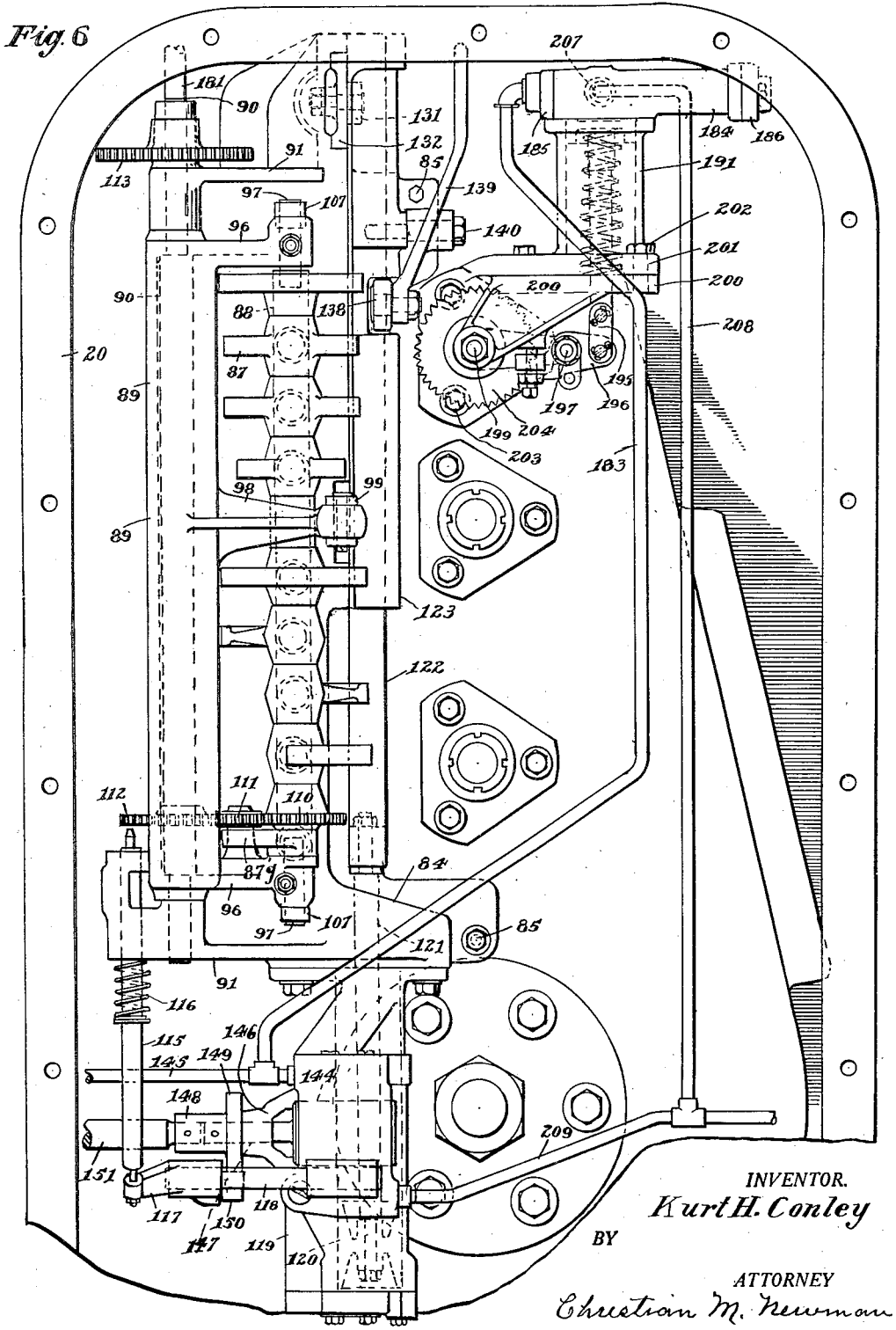
Fig. 6 is an enlarged rear elevation of the gear shifting mechanism shown in Figs. 2 and 4.

Fig. 12 is a horizontal cross sectional view through the frame 84 taken on line 12—12 of Fig. 4, the cradle 89 being omitted;

Fig. 13 is an enlarged front elevational view of the rotatable dial and control handle 162 shown in Fig. 1 for the manual control of the change speed mechanism;

Fig. 14 is also an enlarged, sectional plan view, partially broken away, of the manual control mechanism shown in Figs. 1, 3 and 13;

Fig. 15 is a longitudinal detailed sectional view of the slidable sleeve 159 shown in the mechanism illustrated in Fig. 14;

Fig. 16 is an enlarged sectional elevation of the gear registering mechanism shown at the top of Fig. 6; and Fig. 17 is a top plan view of the fluid operated gear registering means, shown in the preceding Fig. 16.

Figure 2:
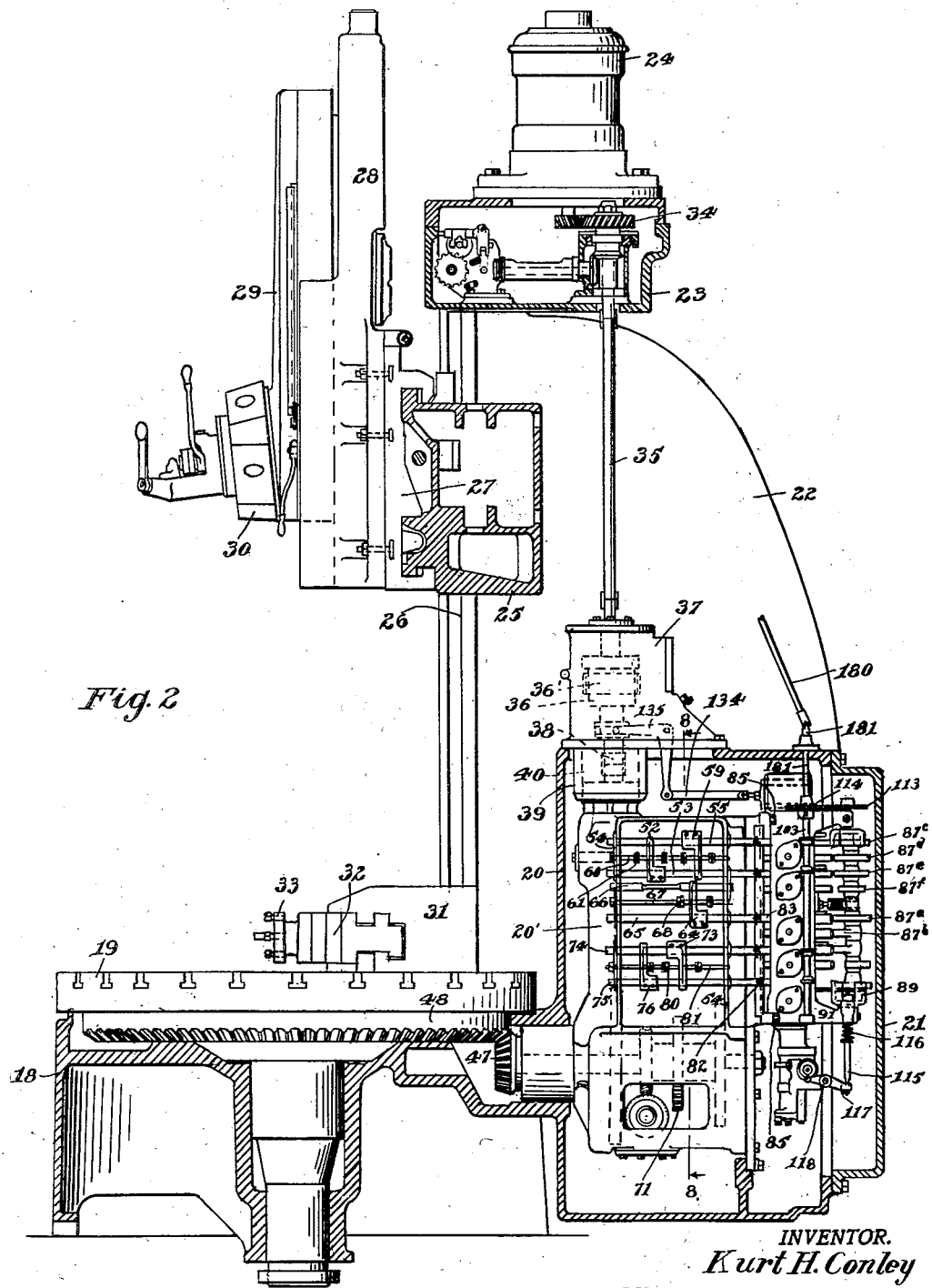
Fig. 2 is a central vertical section through the machine shown in Fig. 1 and as taken on line 2—2 of Fig. 3, illustrating the location and application of the change speed mechanism.

Referring more particularly to Figs. 1 and 2 of the drawings, 18 represents a base having bearings in which the work table 19 is rotatably mounted and geared to be driven through my improved change speed gear mechanism contained within the housing 20 of the base, said housing being provided with a closure plate 21 on the rear side whereby the several units of the change speed mechanism may be placed into position and removed or inspected as occasion may require.

22 indicates a pair of uprights extended above the housing. 23 represents a hollow cross member which is mounted upon the uprights and which in turn serves to support an electric motor 24 for operating the machine. 25 represents a cross rail that is adjustably mounted upon ways 26 of the columns 22 and serves to carry one or more saddles 27 that are slidably mounted thereon, and each of which in turn supports a swivel 28 that carries a turret slide 29. 30 indicates a turret head carried by the slide 29 and adapted for holding tools, not shown. 31 represents a side tool head, one of which is mounted at opposite sides of the table on ways 26 of the uprights 22—22 and serves to carry a tool slide 32 and a turret 33 in which cutting tools are employed.

The rotary work table 19, its change speed gearing, as well as the other operative parts of the machine, are connected to be driven from the motor 24 before mentioned, see Fig. 2, through gears 34, vertical shaft 35, clutch 36 and brake mechanism 36' contained within a clutch housing 37, see Figs. 7 and 8. This clutch 36 is connected to drive a short shaft 38 within a cylindrical depending projection 39 of the clutch housing 37. As shown in the drawings, this projection 39, in part, forms a coupling as between the clutch housing 37 and the gear housing 20' and of which coupling a sleeve 40, secured to the gear housing, forms the remaining connecting portion. For convenience in assembling, this sleeve 40 is made up of several parts, secured together by screws 40ª, and to form a bearing for shaft 40ᵇ that is connected to be driven from the before mentioned shaft 38 through a coupling 40ᶜ.

The change speed gearing referred to, see Figs. 2, 7 and 8, is connected to be driven from the said shaft 40ᵇ through a bevel pinion 41 mounted on said short shaft 40ᵇ and meshing with and driving a similar pinion 42 upon the upper cross shaft 43, which cross shaft, like the other two cross shafts again to be referred to, is journaled in the gear housing 20'. 44 represents the intermediate cross shaft which is driven through suitable fixed and sliding gears from the first mentioned upper cross shaft 43.

45 represents the third or lower cross shaft which is driven through fixed and sliding gears from the intermediate cross shaft 44 operated by the first mentioned cross shaft 43 and suitable gear connection to drive the table pinion shaft 46. This pinion shaft 46 is also journaled in the gear housing and carries a table pinion 47 that meshes with and drives a large bevel gear 48 upon the underside of the work table.

The upper cross shaft 43 carries two cluster sliding gears 49 and 50. The first mentioned cluster sliding gear 49 comprises two gears of different diameters and includes a groove 51 in its hub portion for engagement by a shifting fork 59 carried by a rod 55 slidably mounted in ribs 54 of the gear housing 20' and guided to slide upon a similar slidable rod 53 also mounted for sliding movement in said ribs, said slidable rod 55 being connected to be operated by the uppermost unit of the control drive. The cluster sliding gears 49 may be made to engage with cluster gears 56, and cluster sliding gears 50 to engage with the cluster gears 57, secured to the before mentioned intermediate shaft 44. These two last mentioned cluster gears 56 and 57 are also each composed of gears of different diameters, thus imparting different speeds to the said intermediate shaft 44 according to which of the gears of the two clusters 49 and 50 are engaged. The cluster gear 50 is provided with a groove 58 for engagement by a shifting fork 52 mounted upon the before mentioned slide rod 53. In this connection it will be observed that a fixed rod 60 is positioned between the before mentioned sliding rods 53 and 55 and upon it is mounted adjustable steps 61 to limit the movement of the shifting forks 52 and 59. The above provides four different speeds for the intermediate shaft and which speeds are further multiplied by additional change speed gear connections with the shafts 45 and 46.

The intermediate shaft 44 also carries intermediate slidable cluster gears 62, which is also provided with an annular grove 63 to receive a shifting fork 64 that is secured to a slidable rod 65 and is slidably mounted on a fixed rod 66. A second fixed rod 67 is employed to support adjustable stops 68 to limit the movement of the shifting fork 64. The cluster gears 62 are thus adapted to slide on shaft 44 to engage, one with the gear 69 fixed upon the lower shaft 45, and the other with the larger one of the cluster gear 70 on the same shaft. Cluster gear 70 is adapted for slidable movement upon the shaft 45 to engage with either the gear 71 or 71ª on shaft 46 and includes an annular groove 72 upon one side for engagement by the shifting fork 73 secured to the rod 74 slidably mounted in the ribs 54, and are slidably connected to the slidable rod 75. A second shifting fork 76 is secured to this last mentioned slidable rod 75 and is connected to slide upon the before mentioned slidable rod 74. This fork is for the purpose of engaging the annular groove 77 in the hub of the pinion 78 mounted upon the shaft 45 and adapted for engagement with the large gear 79 upon the table pinion shaft 46. These shifting forks 73 and 76 are also provided with stops, designated as 80, secured to a fixed rod 81 mounted in the ribs 54. This therefore provides a line of drive from the motor to the work table through a speed change mechanism comprising seventeen gears which, when properly operated, may provide sixteen different speeds.

My improved change speed mechanism for shifting the gears, heretofore described, is adapted for hydraulic operation preferably oil, and when applied to a machine of the type herein illustrated can be actuated by the oil pump employed for lubricating the machine, but it will be obvious that the machine can be manually operated by the substitution of an operatable rack of some approved design for the piston now employed in the hydraulic cylinder.

My change speed or control mechanism which I will next describe serves to shift the above gears in their proper combinations to bring about the desired table speeds. In this connection, see Figs. 2, 4 and 8, it will be seen that the gear shifting forks 59, 52, 64, 73 and 76 are secured on slide rods 55, 53, 65, 74 and 75 respectively, mounted for sliding movement in the ribs 54 on the side of the gear housing, which rods are connected by pins 82 to the outer end of racks 83 which form the operative member of the five operating units of the control device. There may be any desired number of these units comprising slide rods and rack mechanisms, which are substantially structural duplicates of each other. These racks 83 are mounted one above the other to slide in a frame 84, which in turn is adapted to be secured to the gear housing as by means of screws 85 positioned in suitable holes 85' of the said frame. This frame 84, together with the mechanism which it supports, comprises in a sense an assembly which is proportionately longer than wide and is vertically positioned against the gear housing 21 within the chamber 20, as shown in Fig. 2, and is positioned in operative alignment with the several slide rods 55, 53, 65 and 75 so that the action of the racks upon the rods will be direct and positive with a resultant minimum amount of friction.

The assembly, as shown, comprises in part, four similar units, one for each of four slide rods, and a fifth which is slightly modified, though all are designed to operate in different combinations with each other, or not at all, as necessity demands, for bringing about the required shifting of gears for desired change of speeds. These operating units, connected through the medium of the before mentioned pins 82, see Fig. 11, serve for the operation of one of the other of the five slidable shifting rods 55, 53, 65, 74 and 75 heretofore mentioned. The cluster gears 49, 50, 62 and 70 each occupy three positions, as for instance the neutral positions shown in Fig. 7, an engaged position of the smaller gear of the cluster 49 with the larger gear of the cluster 56, and an engaged position of the larger gear of the cluster 49 with the smaller gear of the cluster 56. Inasmuch as there is but one slide rod and one slide rack for each of these cluster gears, the said rack and rod must be shiftable to also occupy three positions, and be provided with operating means for sliding the rod from one position to another. This is accomplished through the single slide rack 83 used for each slide rod and by the use of the two sliding cluster gear and by the use of the two plunger racks 86 and 86ᵃ and the neutralizing bar 109, as for instance with the neutralizing bar engaged and operated, as shown in Fig. 11, the plunger racks, slide racks, slide rods and five slidable cluster gears would all be brought to neutral position. If the sector shaft is operated, the upper sector of each selected sector, as for instance 87 in Figs. 11, is engaged with the upper plunger rack 86, and serve to slide the cluster gear 70 to the right into engagement with the gear 71 on the shaft. If the lower sector 87ʰ on the sector shaft is operated, it would obviously draw the slide rack 83 out or to the right, as shown in this Fig. 11, in a way to move the slidable cluster gear 70 to the left, into engagement with the gears 71ᵃ on the lower shaft. In this manner, I obtain two gear engagements with the one slide rod of each unit in addition to neutrally positioning said slide rod and slidable cluster gears. Four of the operating units of the assembly, as shown in Fig. 4, each include a slide rack, an upper plunger rack 86, a lower plunger rack 86ᵃ, cluster gears and selective sectors, whereas the lowermost unit has no lower plunger rack and comprises only the slide rack, the upper plunger rack 86, and the cluster gear and a sector.

In addition to the racks 83 directly connected to the before mentioned slide rods, the units include two other forms of racks 86 and 86ᵃ, each of which are engaged and operated by one of a pair of selective-sectors 87. The pairs of sectors are mounted on a shaft 88 journaled in trunnions 97 in the arm 96 of the cradle 89 hingedly supported on a shaft 90 journaled in the free ends of arms 91 of the frame 84. The rack 83 of each of these mechanisms is operated by a large gear 92 upon a horizontal shaft 93, one end of which is journaled in the body of the frame 84 and the other in a bearing plate 94 secured to the frame 84. This gear 92 is formed integral with a smaller gear 95 thus forming cluster gears to turn together upon the said shaft and whose teeth engage the plunger racks 86 and 86ᵃ mounted for crosswise movement in the frame when actuated by the selective-sectors before mentioned. By this line of connections, it will be seen that as the selective-sectors 87, as shown in Fig. 11, shove the upper plunger rack 86 inward, the lower plunger rack 86ᵃ is forced outward, and the rack 83 is given a horizontal inward movement. On the other hand, as the lower selective-sector 87ʰ shoves the lower plunger rack 86ᵃ inward, rack 83 is given a horizontal outward movement. Either of the above selected movements serve to operate the shifting rods heretofore referred to in the proper direction.

It will be noted that whereas the several pairs of integral gears 92 and 95, heretofore mentioned, are each adapted to occupy one neutral and two engaged positions for the operation of the several cluster gears on the change speed gearing, yet since the pinion 78 on shaft 45 needs only to engage and disengage with the one large gear 79. The lowermost unit, see Fig. 4, of the assembly includes a slide rack 83ᵃ but is provided with only one plunger rack 86 and an operating sector 87ᵍ, there being no lower companion plunger rack, as in the other units, since it is only necessary in this instance to shove the pinion 78 into engagement, whereas the neutralizing bar 109 serves to return it to neutral position. The teeth of this plunger rack 86 engages the small pinion 95, as in the case of the other units, and is formed integral with a larger gear to turn therewith upon their shaft 93. The gear 92ᵃ of this unit, as will be seen from Fig. 4, is slightly larger than the gears 92 employed in connection with the other slide racks 83, thus providing relatively longer movements of the rack 83ª and the pinion 78 as is necessary, due to the greater width of said pinion.

The before mentioned cradle 89 is an elongated semi-cylindrical structure, having a radially projected arm 96 at each end in which are secured aligned trunnions 97 that serve to rotatably support the above mentioned shaft 88, and an intermediate arm 98 to which links 99 are connected for imparting swinging movement to said cradle to bring the selective-sectors into engagement with the plunger racks as above described.

The shaft 88 carries a series of the selective-sectors 87 which may not only be of various forms, but likewise of different diameters in order to accomplish the required operations for the shifting of the different trains of gears. In this connection it will be noted that the selective-sectors 87ª and 87ᵇ shown in Fig. 10 include two substantially semi-circular peripheral surfaces disposed in opposite relation, the first mentioned one being positioned above the last mentioned one, whereas the sectors 87ᶜ, 87ᵈ, 87ᵉ, 87ᶠ shown in Figs. 4 and 9 each include four radially disposed arms of equal length and in equal spaced relation so as to provide four relatively short annular faced engaging surfaces. The engaging surfaces of all the selective-sectors, as shown in Fig. 9 are arranged with relation to each other so as to provide short intervening annular engaging surfaces that operate in selected combinations upon the ends of the plunger racks 86 and 86ª mounted for horizontal sliding movement in the frame 84.

It will be obvious that in the shifting of the sliding gears in a change speed gearing of the type herein shown, it is sometimes the case that the sliding gears will not properly register and will simply abut against the teeth of the mating gear, thus preventing immediate engagement. Therefore, I have provided a yieldable head upon the lower plunger racks located in the lower part of the assembly only, see Fig. 4, which controls or provides for the operation of the sliding gears on the lower cross shafts 44 and 45, yet it is to be understood that they can be provided for more or less of the plunger racks, as occasion may require. This yieldable head, see Fig. 11, includes a longitudinal bore within its cylindrical end portion, to receive a compression spring 100, the outer end portion of which is engaged by a cylindrical closure cap 101, threadably attached in the end of a sleeve 101ª, mounted for limited sliding movement on the cylindrical end portions of the said spring racks through a slot and pin connection 101ᵇ. The before mentioned cap covers the end of the sleeve and rack and forms a head against which the selective-sector pushes.

The frame 84 before mentioned includes bearings 102 for a rotatable cam shaft 103, which, as shown in Fig. 4, carries four spaced-apart cams 104 each adapted, see Figs. 9, 10, and 12, to engage a lock pin 105 having an arrow point to engage a notch 106 in the upper two and lower two driven racks 83, the middle one controlling a sliding gear being employed in every speed combination, which racks are in alignment with said cams and the purpose being to lock such of the driven racks as are not to be used, against possible movement. In this connection it may be stated that this cam shaft 103 is geared to rotate synchronously with selective-sector shaft 88, see Fig. 9, as will again be referred to.

I have provided means whereby all of the gears of the change speed mechanism may be disengaged and placed in neutral positions so that no motion or power can be communicated through the change speed mechanism. I have also provided means, as will be probably best understood from Figs. 4, 9, 10 and 11, which is operated through a movement of the cradle 89 heretofore mentioned, in a direction indicated by arrow B, see Fig. 9. From this Fig. and Fig. 4, it will also be observed that the outer end of links 107 are connected to trunnions 97 in which the shaft 98 is journaled and the inner ends are hingedly connected to one end portion of plane sliding bars 108 that are mounted for reciprocatory cross movement in the frame 84. The other projected ends of these slide bars are attached to the opposite end portions of an elongated vertically disposed bar 109, which is positioned to be brought into registration with the ends of the several plunger racks 86 and 86ª, in order that any of these driving racks, which at this time were out of alignment, may be brought back into aligned neutral position.

As will be understood, these selective-sectors by reason of their various shapes and being rotatable to different positions, provide in this instance sixteen different settings or combinations of vertically disposed surfaces and whereby sixteen possible combinations of gear engagement are provided for driving the work table. This rotary movement or positioning of the sectors is affected through manually operated means positioned on the exterior of the machine convenient to the operator.

In order to insure parallel and non-sliding engagement of the outer surfaces of the selective-sectors with the ends of the racks, I mount selective-sectors, together with a gear 110, on the shaft 88 which is journaled on aligned trunnions 97 of the cradle 89. These sectors are held against rotation during the swinging movement of the cradle, incidental to the operation of the gear engaging mechanism, by the use of an intermediate gear 111 mounted upon a stud secured to the lower arm 96 of the cradle 89 and meshing with a lockable gear 112 and before mentioned selective-sector gear 110. This lockable gear 112 is secured to the shaft 90 which forms the axis upon which the cradle swings and is also adapted to be locked against rotary movement by a pin 115, at a time when unlocked, for independent rotary movement that is imparted to it through the gear 113 upon its upper end that meshes with and is operated by a similar gear 114 carried upon the before mentioned cam shaft 103.

It will thus be seen that by the locking of the gears and sectors in this way, the latter will be held against rotary movement, while the arms of the cradle swing to and from the ends of the racks and whereby the face or ends of the sectors will be brought into direct and non-sliding engagement with the ends of the racks. Gear 112 is locked, see Figs. 4, 6 and 10, by said slidable pin 115 whose end is aligned to engage teeth of the gear, and is actuated longitudinally against its spring 116 through a lever 117 fulcrumed on a stud 118 secured to the casing 119, enclosing the hydraulically operating cylinder and valve mechanism, next to be described.

While it is possible with some slight alterations in design to operate the foregoing described speed change mechanism manually, yet in order to save time and labor on the part of the operator I have especially adapted it for hydraulic operation, which may also serve for operating the main clutch and brake for starting and stopping the gearing. By the expression "hydraulic", I mean to include compressed air. The means for utilizing hydraulic power in the operation of the mechanisms referred to, comprises in part a hydraulic cylinder including a piston 120 operating within a bore of a cylinder within the casing 119, the said piston being mounted upon a reciprocatory piston rod 121 whose outer end is secured to a cam slide 122 and is mounted to reciprocate in ways of a housing 123 secured to the before mentioned frame, see Figs. 4, 5, 6 and 10. This cam slide is provided with cams 124, 125 and 126, each of which serves to perform distinct operations, as will next be described. The cam 124 serves to engage a roller 128 on a slidable plate 129 that is mounted for cross-wise reciprocatory movement in ways of the frame 84, the outer end of this slidable plate 129 being connected by means of an adjustable eye-bolt 130 with the before mentioned link 99 and whereby the slide is connected with the arm 98 of said cradle 89, and whereby the said cradle is rocked through the reciprocatory movement of the cam slide. The cam 125 referred to, see Figs. 4 and 5, serves to operate the main clutch 36 of the machine whereby the same may be started and stopped and for this purpose is designed, when said slide 122 is shoved up from the position shown in Fig. 4, to engage the roll 131 in a cross slide 132 mounted for reciprocatory movement in ways of the frame and casing. An adjustable eye-bolt 133 serves to connect the cross slide 132 with one end of a link 134, the other end of which is connected to the depending arm of a bell crank lever 135, see Fig. 7, secured to a rockable shaft 136 mounted within the main clutch housing. The other end of this lever is connected to a movable member 137 for operating a conventional type of friction clutch 36, whereby the power for operating the machine is applied.

This cam slide 122 also carries a cam 126 that serves to operate the brake 36' through the following described mechanism. The cam 126 formed in the edge of the slide 122 serves to engage a roll 138, see Fig. 6, that is carried on a lever 139 fulcrumed on a stud 140 secured to the housing 123, and whose upper end, see Fig. 7, engages one end of a push rod 141 mounted to slide in a cylindrical member 39 and lines to engage a lower end of a lever 142 fulcrumed at 143 and whose upper end is in engagement with an operative member of the brake 36'.

Referring again to the casing 119, shown in Figs. 4 and 7, it will be seen that in connection with the piston and bore, shown by dotted lines therein, I also employ a three positioned hydraulic control valve 144 for controlling the oil supplied through pipe 145 in its pasasge to the cylinder from any suitable source, as for instance a pump, not shown, located on the machine, and whereby oil used in the lubrication of the machine may also be used as the hydraulic means for manipulating the piston.

In this connection it will be observed that when the piston goes clear up, the machine is in working condition with the table running and clutch engaged, and brake disengaged. When the piston is one-half way down, the clutch is disengaged, brake engaged and machine stopped, but the gears remain engaged. When the piston is in its downmost position, as shown in Fig. 4, the gears are withdrawn to their neutral position, and the gear shifting mechanism cleared for selection of a new speed.

Referring to Fig. 6, it will be noted that a bearing 146 extends outward from the casing 119 to accommodate the stem 147 of the three-way valve within. To the outer end of this stem is secured a sleeve 148 that carries a cam 149 to engage a roll 150 carried upon the end of the lever 117 pivoted at 118, hereinbefore described, and which serves for operating the gear locking means 115 before mentioned. To the sleeve 148 is also attached a horizontally disposed shaft 151 by means of which the valve 144 is operated, that extends outward through the rear portion of the base and the side of the machine, as shown in Figs. 1 and 3, where an arm 152 is secured and to which one end of a link 153 is connected, the other end of said link being similarly connected to a similar arm 154 mounted upon a vertical shaft 155 journaled in suitable bearings 156. An arm 157 is keyed to slide on this vertical shaft 155 with the raising and lowering movement of the side tool head 31. One end of a link 158, see Figs. 1, 3, 14 and 15, is connected to this arm 157 while the other end is hingedly connected to a special form of sleeve 159 having an opening intermediate its length and adapted for reciprocatory movement on the tubular shaft 160 that is mounted for rotary movement in the housing bracket 161.

A control rod 162, having a handle upon its outer end for slidable and rotatable manipulations, serves as the operatable medium through which the before mentioned three-way valve 144 is operated. This rod is mounted to slide within the tube 160 and is provided with a key 163 that extends longitudinally through aligned slots 164 in the said tubular shaft and engages a slidable collar 165 mounted upon the hollow shaft and positioned intermediate of the spaced-apart hub portions of the sleeve 159.

Upon the front end portion of the hollow shaft 160 is mounted a wheel 166 to which a disk 167 is secured, having a series of numbers indicated upon its face forming a dial to be read in connection with the arrow point positioned in the R. P. M. plate, see Fig. 13, secured to the face of the housing bracket 161. From this it will be seen that a longitudinal movement of the handle 162 will slide the sleeve 159 accordingly, in a way to turn the shaft 155 and its connected parts 170, 174, up to and including the stem 147 of the hydraulic valve 144, and that a rotary movement of the handle 162 allows the collar 165 to turn without affecting the sleeve, but will cause the hollow shaft to rotate. A bevel gear 168 is mounted upon this hollow shaft and meshes with a similar gear 169 secured to the end of a shaft 170 journaled in part in the bracket 161 and in part in a second bracket 171 secured to the top side of the side head and carrying a second bevel gear 172. This gear 172 meshes with a companion bevel gear 173 that is keyed for slidable movement upon a vertical shaft 174, the lower end of which has a bearing in said bracket and the other end in a bearing 175 secured to the end of the hollow cross member 23 see Fig. 1. This shaft is thus adapted for rotary movement and carries a sprocket 176 upon its upper end that is connected by a sprocket chain 177 with a similar sprocket 178 on a short shaft 179 having a flexible connection with the upper end of an angularly disposed shaft 180 and whose lower end is also flexibly connected to a short vertical shaft 181 that aligns and connects with the before mentioned cam shaft 103 journaled in bearings 102 of the frame 84, see Figs. 2, 4 and 6. From the foregoing described mechanisms, it will be seen that the operation of the machine, selection of proper speeds and starting and stopping, may be entirely controlled by the one little handle 162, as shown in Figs. 1, 3 and 14. This handle, as before suggested, is adapted to be rotated for sixteen change speed connections as disclosed by the mechanism herein shown, as well as to be moved inward and outward, to three positions.

While the machine is adapted to be operated by the handle 162 positioned on one of the side heads of the machine, as shown in Fig. 3, yet it will be obvious that a similar handle and connections therefrom to the control mechanism can also be, if desired, mounted upon another part of the machine, as for instance the side head 31, see Fig. 2, mounted upon the other side of the machine. For this reason I have shown, in Fig. 3, the shaft 151 extending entirely through the base of the machine which not only would serve to permit of the operation of the machine by the single handle, as shown in the drawings, but would provide for the connection of such additional operating means as might be found desirable, and to avoid the necessity of the operator going back to the same side of the machine each time that it might be necessary to stop or start the same.

The several gears of the change speed mechanism being disengaged as shown in the drawings, it would be necessary, in order to start the machine, to shove the control handle 162 to its innermost position. In this connection it is to be understood that while the handle is movable longitudinally, yet these movements are for the purpose of locating it at three distinct positions, as for instance, the outer position indicated in Fig. 14, an innermost position wherein the sleeve 159 would be positioned on the rear end portion of the hollow shaft 160; and an intermediate position. The outermost position of the handle causes a neutral position of the gears and their associated parts, whereupon a new combination of a speed gears may be effected. The placing of the handle at its innermost position would start the machine, by first rotating the hydraulic valve 144 which moves the slide to such a position as to start the machine, the mechanism functioning automatically in the following sequence: first to disengage the brake, second to engage the selected combinations of speed gears, and third to engage the main clutch. A subsequent outward movement of the handle to the intermediate position again operates the hydraulic valve in a way to cause the main clutch to disengage and the brake to engage, causing the stoppage of the machine, this intermediate position being readily indicated to the operator by a slight resistance to the movement of the handle when it reaches said position, due to the engagement of the notch 49' of the cam 149 with the cam roll 150 on the spring actuated lever 117, which in effect serves as a detent. The machine may again be started by shoving the handle directly into its rear position. A movement of the handle from the intermediate position to the outermost position would serve to bring about a further operation of the valve and cause the disengagement of all gears, preparatory for a new selection of gear combinations, as may be desired. These available speeds are indicated by numbers, as for instance those shown on the face of the dial, see Fig. 13, the said dial being connected to be rotated by the handle 162, so that any one of the numbers on the dial may be brought to register with the arrow point on the R. P. M. plate and thus indicate a definite position of the internal mechanism, including the cam shaft 103 and its cams 104, said cams serving to lock into neutral position the speed gears which are not to be used, and shaft 88 which carries the selective-sectors.

In order to insure the engagement of the numerous gears of the change speed mechanism when they are shifted for the purpose of driving the machine at any one of the numerous speeds, I provide a gear registering mechanism which serves to bring into proper rotative position any gears which may have jammed by reason of the ends of the teeth of the shiftable gears abutting against the ends of the teeth of the gears to be engaged. While it is desirable to provide a means for the above purpose, it is also important that the same should be of a quick acting nature so that there can be no possible jam or delay in the operation of the gear shifting device. Therefore I have provided hydraulic means which are taken from the source of supply, pipe 145, as that used for the operation of the speed changing mechanism, and which will be best understood by referring to Figs. 6, 16 and 17 of the drawings.

This means includes an automatic spring resisting hydraulically-operated slide valve 182, see Fig. 16, pressure for which is supplied through a pipe 183 connected with the before mentioned supply pipe 145. This slide valve is mounted in an elongated body 184 having a bore therein, the ends of which are closed by cap 185 and bearing 186. The said valve, as will be seen is provided with a stem 187 that extends through the length of the bore and has a bearing in the member 186 mentioned above. A spring 188 is positioned upon this stem with one end positioned against the cap 186 and the other against the valve head 182. The purpose of this spring is to provide a limited pressure upon the valve and hold it against the end of the cap 185 in a way to close the opening therethrough.

The pressure through the pipe 183 acts upon the head of the valve 182 in a way to force it back against the spring in a manner to open the admisssion port 189 and close the exhaust port 190, thereby admitting the oil pressure into the cylinder 191 against the piston 192 positioned therein and having a stem 193 around which a resistant spring 194 is mounted, and to the exposed lower end of which stem one end of a link 195 is connected. The other end of the link is connected to a pawl 196 hingedly supported upon a stud 197 secured to an arm 198 that is secured on a stud 199 rotatably mounted in a bracket 200. This bracket 200 is fastened to the underside of a bracket 201 by means of screws 202 and which bracket in turn is fastened to the gear housing 20' by means of screws 203. The stud 199 is concentric with the upper shaft 43 of the change speed mechanism, see Fig. 7. The pawl 196 mounted upon the arm 198 serves to engage teeth of the toothed wheel 204, which as will be seen is mounted upon the upper shaft 43 of the change speed mechanism, and whereby it is given a sufficient rotary movement to turn said shaft and gears carried thereby, so that the latter will properly register with the gear of the second shaft, and a gear of that shaft register with a gear of the third shaft, and finally a gear of the third register with a gear of the pinion shaft, thus completing the registration of the selected train of gears and permitting of the completion of their engagement.

The gear registering mechanism thus described is automatically operated, if and at any time the gears of the change speed mechanism do not register, and in fact is caused to function by their failure to register and engage. In this respect, it will be recalled that the shifting mechanism for these gears is operated by the main hydraulic piston 120 which is designed to take a full upward stroke for the complete operation of the control mechanism. This complete operation of the piston under normal conditions requires but a relatively light pressure upon the piston and which pressure, though similarly applied to valve 190 is not sufficient to operate said valve due to the counteracting pressure applied by the spring 188. If upon the other hand, any one or more pairs of gears in the train fail to register and engage, the piston of the main cylinder cannot travel a sufficient distance to bring the selected pairs of gears in the combination into mesh, thus locking the piston against any further movement and causing the fluid pressure to build up therein and against the valve 182 in a way to move it in against its spring, thereby opening the port 189 in a way to admit the pressure against the piston 192 and causing it to function as previously described in a way to turn the toothed wheel 204, its shaft and gears. This operation caused by the excessive fluid pressure follows very quickly after the movement of the piston of the main cylinder is retarded, thereby causing the gears to register without noticeable delay.

It will be obvious that immediately upon the registration and engagement of the gears by the mechanism just described, the piston of the main cylinder is free to complete its movement, thereby releasing the pressure and allowing the spring 188 to function to close the port 189 and open the port 190, whereupon the spring 194 expands to move the piston 192 back to its normal position and the withdrawal of the pawl from the toothed wheel. It will also be noted that a suitable friction device is employed, see Fig. 17, in connection with the arm 198 that serves to support said arm in its operative position by resisting any rotative movement of the arm. As before stated, the arm 198 is secured upon a stud 199 which is rotatably mounted in the bracket 200. A spring 205 is positioned upon the outwardly extended end portion of the stud and between a collar positioned thereon and nuts 206 that serve to hold the side of the arm in frictional engagement with the end surface of the hub of the arm against the face of the bracket.

From the foregoing it will be obvious that an outward movement of the piston 192, when actuated by the fluid pressure, will force its stem 193 outward and through its link connection 195 cause the pawl 196 to engage with the ratchet wheel 204 and move it forward the required distance, as indicated by dotted lines in Fig. 16, and after which, with the fluid pressure released, the said spring 194 will cause the piston to be returned to its upper normal position.

If for any reason, and after the gear registering mechanism heretofore described has functioned, the gears of the change speed mechanism still refuse to mesh properly, the fluid pressure against the head of piston valve 182 will be built up to a sufficient amount to move said piston valve further, thus uncovering safety port 207 which is connected by a pipe 208 with outlet pipe 209 from the main cylinder, and which serves in this instance to supply lubrication to the machine.

Having thus described my invention, what I claim and desire to secure by Letters Patent is:

1. Means for operating change speed gearing, comprising a slide rack adapted to be connected with a shiftable gear of said change speed gearing, a gear connected with the slide rack, a second gear connected with the first mentioned gear, a slidable plunger rack in engagement with said last mentioned gear and adapted to operate it and the slide rack, a sector for said plunger rack, and means for operating the sector to engage the plunger rack.

2. Means for operating change speed gearing, comprising a slide rack adapted to be connected with a shiftable gear of said change speed gearing, a gear connected with the slide rack, a second gear connected with the first mentioned gear, a plunger rack for said last mentioned gear adapted to operate it and the slide rack in two directions, a rotatable sector for said plunger to operate each rack, and means for operating the sector.

3. The combination with a series of sliding gears of a change speed gearing, of a series of units for each sliding gear including a slide rack adapted to be connected with one of said sliding gears, a gear connected with the slide rack, a second gear connected with the first mentioned gear to operate on the same axis as the first mentioned gear, plunger racks for said last mentioned gear adapted to operate it and the slide rack in two directions, a rotatable sector for each plunger rack, and a single means for engaging all of the sectors with said plunger racks.

4. The combination with change speed gearing including a fixed and a sliding gear, and a slide rod connected with said sliding gear, of means for operating the same comprising a rack connected with the slide rod, a pair of gears, one engaged to operate said rack, a plunger rack for the second gear, a sector for the plunger rack, a shaft upon which the sector is mounted, and manual control means for rotating the shaft and sector.

5. The combination with change speed gearing including fixed and sliding gears, slide rods connected with said sliding gears, of means for operating the same comprising a rack connected with each slide rod, a pair of gears, one engaged to operate said rack, a plunger rack for the second gear, a sector for each plunger rack, a shaft upon which the sectors are mounted, manual control means for rotating the shaft and sectors, and a cam slide for controlling the mechanism for shifting the gears.

6. The combination with change speed gearing including fixed and sliding gears, of means for operating the same comprising a slide rack connected with said sliding gears, a pair of gears, one engaged to operate said rack, a yieldable plunger rack for operating said gears, rack and shiftable gears to insure a yieldable engagement of the latter, and selective means for operating said yieldable plungers.

7. A change speed mechanism including shiftable gears, comprising a series of slidable racks adapted to be connected with said shiftable gears, gears and racks to operate said slidable racks and shiftable gears, means for selectively operating one or more of said slidable racks and shiftable gears, and means for simultaneously locking the remaining racks and shiftable gears to prevent movement of the same.

8. A change speed mechanism comprising a slide rack adapted to be connected with shiftable gears of a change speed gearing, a gear connected with the slide rack, a second gear connected with the before mentioned gear, plunger racks in engagement with the last mentioned gear adapted to operate it and the slide rack in two directions, means for operating some of the racks to connect a selected few of the change speed gears, and means for locking the remaining racks to prevent movement of the remaining gears.

9. A change speed mechanism comprising a slide rack, a gear connected with said slide rack, plunger racks, means connecting said last mentioned racks with said gear adapted to operate the slide rack in two directions, a rotatable shaft, a pair of sectors mounted thereon to operate the plunger racks, a swinging cradle in which the shaft is mounted, and means to operate the cradle to engage the sectors with the plunger racks.

10. A change speed mechanism comprising slide racks, gears connected with said slide racks, plunger racks, means connecting said last mentioned racks with said gears adapted to operate the slide racks in two directions, a rotatable shaft, a series of sectors mounted thereon to operate the plunger racks, a swinging cradle in which the shaft is mounted, means to rotate the shaft and sectors to bring the few selected sectors into registration with the plunger racks, and means to operate the cradle to bring he selected sectors into engagement with the plunger racks.

11. The combination with a series of slidable gears, of a change speed mechanism, of a series of units for each slidable gear, each unit including a slide rack adapted to be connected with a slidable gear of said change speed mechanism, a gear connected with the slide rack, a second gear connected with the first mentioned gear, plunger racks for said last mentioned gear adapted to operate it and the slide rack in two directions, a rotatable sector for each plunger rack, means for positioning said sectors for engagement with the plunger racks, and means for moving the selected sectors into operative engagement with said plunger racks.

12. The combination with a series of slidable gears of a change speed mechanism, of a series of units for each slidable gear, each unit including a slide member, a pair of slidable plungers, means connecting the plungers with said slide member for operating the latter in two directions, a sector for each plunger, a shaft upon which the series of sectors are mounted, a swinging cradle in which the shaft is journaled, means to rotate the shaft and sectors to align certain of the sectors with certain of the plungers, cam means to operate the cradle to move the selected sectors into engagement with certain plungers, and cam means intermediate the sector shaft and the plungers whereby certain of them are locked against movement while others are operated by the selected sectors.

13. The combination with a change speed gearing, including a clutch and brake for the same, of operating means for said gearing comprising a series of slides connected to shift gears of said change speed gearing, a series of rotatable selective-sectors for operating said slides, means for selecting some of said sectors for alignment with some of said slides, means for moving said selected sectors into operative engagement with said slides, a cam for operating said moving means, and cams for operating the clutch and brake.

14. The combination with a change speed gearing, including a clutch and brake for the same, of operating means for said gearing comprising a series of slides connected to shift gears of said change speed gearing, a series of rotatable selective-sectors for operating the slides, a cradle in which the sectors are rotatably mounted, means for positioning some of said sectors for alignment with the slides, cam means for moving said cradle and selected sectors into operative engagement with the slides, cams for operating the clutch and brake, and hydraulic means for operating the cams.

15. The combination with a series of slidable gears, of a change speed mechanism, of a series of units for each slidable gear, each unit including a slide member, a pair of slidable plungers, means connecting the plungers with said slide member for operating the latter in two directions, a sector for each plunger, a shaft upon which the sectors are mounted, a swinging cradle in which the shaft is journaled, means for rotating the shaft and sectors to align certain of the sectors with certain of the plungers, cam means to operate the cradle to bring certain selected sectors into alignment with certain plungers, and hydraulic means for operating said cam means.

16. In a change speed mechanism, the combination of a frame, a cradle hingedly connected thereto, two series of plunger racks in said frame, a rotatable shaft journaled in the cradle, a series of different forms of sectors mounted on the shaft to register with the plunger racks, means for rotating the shaft and sectors to align different sectors with different plunger racks, a cam slide mounted in the frame for operating the cradle to engage the sectors with the plunger racks, means to engage all of one series of racks in a manner to move them to neutral positions, means for operating the cam slide, a shaft geared to rotate the sector shaft, and means for rotating said shaft.

17. In a change speed mechanism, the combination of a frame, a cradle hingedly connected thereto, two series of slide rods in said frame, a rotating shaft journaled in the cradle, different forms of sectors mounted on the shaft to register with said slide rods, means for rotating the shaft and sectors to align different sectors with different slide rods, a cam slide mounted in the frame for operating the cradle to engage the sectors with the slide rods, means to engage all of one series of rods in a manner to move them to neutral positions, means for operating the cam slide, a cam shaft geared to rotate the sector shaft, means for rotating the cam shaft, and cams on said cam shaft to lock some of the slide rods in one series to prevent movement of same while others are operated.

18. The combination with a series of sliding gears, of a change speed gearing, of a unit for each slidable gear, each unit including slide rods, a frame for carrying said units, two different forms of sectors for each unit, a common rotary shaft upon which all the sectors are mounted for selective positioning, movable means upon which the shaft and sectors are carried with respect to the unit, means for rotating the shaft and sectors to align some of the different forms of sectors with the slide rods of different gear shifting units to be operated thereby, and means to move the selected sectors into engagement with a slidable member of some of the units.

19. A change speed mechanism adapted for attachment to a head stock, comprising a frame, a cradle hingedly connected thereto, a series of gear shifting slide rods mounted in said frame, a rotatable shaft journaled in the cradle, a series of different forms of sectors mounted on the shaft, said sectors adapted for selective positioning with some of the slide rods, means for rotating the shaft, means for swinging the cradle to bring the selected sectors in position to operate certain of the slide rods, and means to lock those of the rods which are not operated by the sectors to prevent possible movement and the shifting of gears with which they are connected.

20. A change speed mechanism comprising a frame, operating rods slidable in the frame, a cradle hinged to the frame, selective means carried by the cradle for operating the slide rods, cam means mounted in the frame and connected to operate the cradle to cause the selective means to operate the rods, and hydraulic means for operating the cam means.

21. The combination with a change speed gearing, of a driving shaft, slides for operating slidable gears of said gearing including a frame in which said slides are mounted, a shaft journaled in the frame, a cradle hingedly connected to the frame, a shaft upon which the cradle is mounted, a sector shaft journaled in the cradle, sectors mounted on the sector shaft to engage the slides, gearing intermediate the three said shafts, pin means to engage teeth of one of said gears to prevent its rotation and the rotation of the sector shaft after the sectors have been set for engagement with the slides.

22. The combination with a change speed gearing, of a change speed mechanism comprising a series of operating units, a series of rotatable sectors for positioning with respect to said operating units, means for selectively rotating the sectors comprising a rotatable sleeve, an operative connection therefrom to said sectors, a cam for moving the sectors into engagement with the operatable units, hydraulic means for operating the cam, a valve for operating the hydraulic means, an operating handle within the before mentioned sleeve, and connections therefrom with the valve for operating the same to operate the hydraulic means.

23. The combination with a change speed gearing, of a change speed mechanism comprising a series of operating units, one for each speed desired, a rotatable shaft, pairs of rotatable operating sectors mounted on said shaft, each adapted to engage and operate one of said units, said sectors being so constructed that a partial rotation thereof would bring certain sectors into registration with some of the units, a further rotation of said sector shaft bringing other of said sectors into registration with other of said units, manually operatable means for rotating said sectors whereby any of said sectors may be lined up for engagement with the selected units, and a dial adapted to be read to determine which of the sectors are brought into operation and what result in speed of the change speed gearing is to be produced.

24. The combination with a series of slidable gears of a change speed mechanism, of a series of units for said gears, each unit including a slide member, a pair of slidable plungers, means connecting the plungers with said slide members for operating the latter in two directions, a sector for each plunger, a shaft upon which the sectors are mounted, a swinging cradle in which the shaft is journaled, means for rotating the shaft and sectors, said sectors including differently spaced engaging points so that different positions of the shaft will cause predetermined sectors to register with certain of the units to shift desired gears, cam means to operate the cradle to bring certain selected sectors into alignment with certain plungers.

25. In a change speed mechanism, the combination of a frame, a cradle hingedly connected thereto, a series of slide rods in said frame, a rotatable shaft journaled in the cradle, a series of different forms of sectors mounted on the shaft, one to register with each of the slide rods, means for rotating the shaft and sectors to align different sectors with different slide rods, a cam slide mounted in the frame for operating the cradle to engage the sectors with the slide rods, means for disengaging all of said sectors from all of the slide rods, means to engage all of said rods in a manner to move them to neutral positions, and means for operating the cam slide.

26. The combination with a change speed gearing including a driving shaft and driven shafts, fixed and sliding gears on said shafts whereby different selective trains of gearing may be connected, means for shifting the gears to form different speed trains, hydraulic means connected with the first mentioned driving shaft for lightly operating it, its gears, and the gears upon the driven shafts to insure proper registration and meshing of all gears in the train of gears selected to be operated.

27. The combination with a change speed gearing including a driving shaft and driven shafts, fixed and sliding gears on said shafts whereby different selective trains of gearing may be effected, means for shifting the gears to form different speed trains, hydraulic means connected with the first mentioned driving shaft for lightly operating it, its gears, and gears upon the driven shafts including a spring actuated piston, a pawl and ratchet to insure proper registration and meshing of all gears in the train of gears selected to be operated.

28. The combination with a change speed gearing including a driving shaft and driven shafts, fixed and sliding gears on said shafts whereby different selective trains of gearing may be connected, means for shifting the gears to form different speed trains, means connected with the first mentioned driving shaft for lightly operating it, its gears, and the gears upon the driven shafts to insure proper registration and meshing of all gears in the train of gears selected to be operated, including a pawl and ratchet to step up the driving shaft, and means for operating said pawl and ratchet.

29. A change speed mechanism operating means comprising a slidable operating member, a rotatable sleeve in which it is mounted, a rocker shaft connected to be operated by the sliding member, a rotatable shaft connected to be operated by the sliding member, and a dial carried by the sleeve to determine its rotated position.

30. A change speed mechanism operating means comprising a supporting bracket, a slotted rotatable sleeve mounted therein, an operating member slidable with respect to the sleeve and connected to rotate the same, a dial mounted upon the rotatable sleeve whereby its rotated position may be determined, a rotatable shaft, gear connections therefrom to the rotatable sleeve whereby the shaft is turned by the rotation of the sleeve, a rocker shaft, a member slidably mounted on the sleeve and connected to be moved with the slidable operating member, a rocker shaft and connections therefrom to the sliding member upon the sleeve.

31. The combination with a change speed gearing including fixed and slidable gears, of means for moving said slidable gears comprising a series of aligned units including slide rods, each unit connected with one of the sliding gears, an aligned series of rotatable selective-sectors aligned to register with desired ones of the operating units, and means for moving the selected sectors into engagement with the operating units, to operate the slidable gears.

32. The combination with a change speed gearing including fixed and slidable gears, of means for moving said slidable gears comprising a series of aligned units including slide rods, each unit connected with one of the slidable gears, an aligned series of rotatable selective-sectors aligned to register with desired ones of the operating units, means for moving the selected sectors into engagement with the operating units to operate the slidable gears, and a series of cams aligned to function in connection with the several aligned units to automatically lock those units not selected for operation.

33. The combination with a change speed gearing including fixed and slidable gears, of means for moving said slidable gears including a series of aligned units comprising slide rods, each unit connected with one of the sliding gears, a cradle, an aligned series of rotatable selective-sectors mounted in the cradle and aligned to register with the operating units, means for moving the cradle and selected sectors into engagement with the operating units to operate the slidable gears, and means to return all the units back to normal positions.

34. The combination with a change speed gearing including fixed and slidable gears, of means for moving said slidable gears including a series of aligned units each comprising two slide racks, each slide rack connected with one of the slidable gears, a pair of plunger racks for each slide rack, operative connections between the said racks, a cradle, a pair of selective-sectors carried by the cradle for each slide rack and aligned to register with the plunger racks, and means for moving the cradle and selected sectors into engagement with the operating units to operate the slidable gears.

35. A selective operating means comprising a frame, slidable racks mounted in the frame and connected to be operated one by another, a series of sectors adapted to engage the racks, a rotatable shaft upon which the sectors are mounted, a cam shaft, gear connections between the cam shaft and the sector shaft whereby they are operated in relation to each other, means for operating the cam shaft, and cams on the cam shaft to lock some of the slide racks while others are operated.

36. A selective operating means comprising a frame, slidable racks mounted in the frame and connected to be operated one by another, a cradle hinged to the frame, a series of sectors carried by the cradle adapted to engage the racks, a rotatable shaft upon which the sectors are mounted, a cam shaft, gear connections between the cam shaft and the sector shaft whereby they are operated in relation to each other, means for operating the cam shaft, and cams on the cam shaft to lock some of the slide racks while others are operated.

37. A selective operating means comprising a frame, slidable racks mounted in the frame and connected to be operated one by another, a cradle hinged to the frame, a series of sectors carried by the cradle adapted to engage the racks, a rotatable shaft upon which the sectors are mounted, a cam shaft, gear connections between the cam shaft and the sector shaft whereby they are operated in relation to each other, means for operating the cam shaft, cams on the cam shaft to lock some of the slide racks while others are operated, and means to swing the cradle to bring the sectors into engagement with the slide racks.

38. A selective operating means comprising a frame, slidable racks mounted in the frame and connected to be operated by each other, a cradle hinged to the frame, a series of sectors carried by the cradle adapted to engage the racks, a rotatable shaft upon which the sectors are mounted, a cam shaft, gear connections between the cam shaft and the sector shaft whereby they are operated in relation to each other, means for operating the cam shaft, cams on the cam shaft to lock some of the slide racks while others are operated, cam means to swing the cradle to bring the sectors into engagement with the slide racks, hydraulic means to operate the cam means including a valve, and a cam on the valve stem to lock the gears.

39. Means for operating change speed gearing, comprising a slide rack adapted to be connected with a cluster sliding gear adapted to engage other gears of said change speed gearing, a pair of gears one of which is connected to said slide rack, slidable plunger racks in engagement with the other of the pair of gears adapted to operate it and the first mentioned rack in opposite direction, to engage the cluster gear with the other gears, and means to engage said plunger racks to operate the slidable rack and shiftable gears in two directions.

40. The combination with change speed gearing including two fixed gears upon one shaft, cluster sliding gears on an adjacent shaft adapted to engage the first two mentioned gears, means for moving the cluster gears in one direction to engage with one of the first mentioned gears, and means for moving the cluster gears in the opposite direction to engage with the other of the first mentioned gears.

41. The combination with a change speed gearing including shafts and gears, a cluster sliding gear, a plunger rack and sector for operating the cluster sliding gear in one direction for engagement with a gear on an adjacent shaft, a plunger rack and sector for operating the sliding gear in an opposite direction for engagement with a second gear on said adjacent shaft, and means for simultaneously returning both the plunger racks and cluster gears to normal positions.

42. The combination with change speed gearing including shafts and gears, a cluster sliding gear, a plunger rack and sector for operating the cluster sliding gear in one direction for engagement with a gear on an adjacent shaft, a plunger rack and sector for operating the sliding gear in an opposite direction for engagement with a second gear on said adjacent shaft, gears connecting the two plunger racks to be operated simultaneously in opposite directions, and means for simultaneously returning both the plunger racks and cluster gears to normal positions.

43. In a change speed mechanism, a clutch, a shiftable gear, a rack bar for shifting said gear, a cam movable to actuate said rack bar and a second cam movable to actuate the first mentioned cam and said clutch.

44. In a change speed mechanism, a clutch, a shiftable gear, a rack bar for shifting said gear, a cam movable to actuate said rack bar and a second cam movable to actute the first mentioned cam and said clutch in successive order.

KURT H. CONLEY.